United States Patent Office 2,757,086
Patented July 31, 1956

2,757,086

METHOD OF WET-STRENGTHENING PAPER WITH HIGH MOLECULAR WEIGHT UREA-FORMALDEHYDE RESINS

Erwin E. Morse, Gorham, N. H., assignor to Brown Company, Berlin, N. H., a corporation of Maine No Drawing. Application August 19, 1950, Serial No. 180,513

5 Claims. (Cl. 92—21)

This invention relates to the manufacture of wet-strength paper and more particularly to papers having incorporated therein as a wet-strengthening agent, relatively small amounts of cured urea-formaldehyde resin. Such papers now find use as toweling, wet-packaging sheets, etc.

A substantial advance in the art of wet-strengthening paper was made when commercially acceptable wet-strength properties were imparted to the paper through beater addition of such resins in an uncured state, with subsequent curing of the resin during and/or after the paper-making operation. For example, the Uformite resins (The Resinous Products and Chemical Co.) have been used in large quantities for such purposes.

I have now discovered that certain forms of urea-aldehyde resins, prepared in accordance with the invention hereof, provide papers having wet-strength properties equivalent to those found in present day urea-aldehyde wet-strengthened papers, although my resins are utilized in materially less quantity, based on the dry weight of the finished paper, thus effecting a substantial saving in resin usage. Concomitantly, the wet-strength properties of a paper may be substantially increased with the use of the agents of this invention over those secured with the same usage of present day wet-strengthening agents. Moreover, the curing rates of these new resin materials are also so much faster that products of more uniform and better wet-strength result for a given usage.

The attainment of equivalent wet-strength properties, with addition—in the case of beater addition—of smaller quantities of the agent to a given amount of pulp in the beater, results from higher retention of the resin on the fibre. It is well known that large proportions (50% or more) of the beater addition of present day commercial wet-strengthening urea-formaldehyde resins are lost to the white water and eventually go to the sewer. Usually, the greater the percentage of resin that is sought to be retained, i. e., the higher the wet-strength sought in the finished paper, the greater the proportion of unretained and lost agent.

A primary object of this invention, therefore, is the preparation of a resin which will be better adsorbed and retained by the fibre in the beater. This permits not only less resin usage in the beater for a given wet-strength, but also a percentage usage, for a given wet-strength, in the lower ranges where the curve of retention is most favorable.

A second object of the invention is the preparation of a resin, the curing time of which is more rapid so that more advanced cures can be effected while the paper is on the paper machine. With a greater degree of cure, greater wet-strength properties are imparted for a given resin addition and hence, resin usage may be reduced for the production of a given wet-strength.

A twofold savings in resin usage is thus made possible.

Resinous materials utilized in accordance with this invention are the highly condensed, high viscosity, high molecular weight components of normal polymeric systems of urea-aldehyde condensation products.

I have discovered that there is a marked difference in the degree of retention on cellulose fibres between the high molecular weight components of the urea-aldehyde resins heretofore used as paper wet-strengthening agents and the low molecular weight components of these resins. The presence, at the time of beater addition, in present day wet-strengthening agents, of such low molecular weight components thus greatly detracts from the overall retention, since I have demonstrated that the loss to the white water involves, for the most part, these low molecular weight components.

I have also discovered that these low molecular weight components have little, if any, intrinsic wet-strengthening power and possess low curing rates. Hence, even when adsorbed by the fibre and retained, these components contribute little, if at all, to the wet-strengthening properties of the finished paper.

The high molecular weight systems which secure the paper-making advantages above enumerated may be variously prepared, as by dialysis, ultra-centrifuging, fractional precipitation, etc. In accordance with the preferred procedure of this invention, they are separated from undesired low molecular weight components of commercial wet-strengthening resins, such as Uformite 467, Catavar 2156 (Catalin Corp.) and Bakelite QRU-5—by fractional precipitation prior to the beater addition. The preferred procedure of this invention, from one standpoint, therefore, may be viewed as involving a removal, by fractional precipitation, prior to the addition of the resin to the beater, of those components, or a large part of them, of the normal polymeric system which either are lost to the white water and, therefore, cannot anyway, for lack of retention, contribute to the wet-strengthening properties of the finished paper, or, if retained, do not, by reason of low intrinsic wet-strengthening power and slow curing rate, contribute in any substantial way to the wet-strengthening properties.

The amount of lower molecular weight components to be removed depends upon the desired increase in wet-strengthening efficiency; the minimum quantity which may be removed and still yield some improvement in wet strength and/or curing rate will depend upon the type of fiber, the acidity of the stock, etc. In general, lower molecular weight components comprising at least 10% of the total resin solids should be removed to obtain a significant increase in wet-strengthening efficiency, thus providing a fraction the components whereof have an abnormal molecular weight distribution characterized by a concentration of components of molecular weight ranging about a relatively high molecular weight in numbers materially above the concentration of components about said high molecular weight in a normal urea-aldehyde condensation product molecular weight distribution.

Because of the increased curing rates and the increased wet-strengthening power secured by initial separation from the low molecular weight components, the high molecular weight materials of this invention also provide substantial benefits when utilized to wet-strengthen paper by application thereto after formation of the beaten pulp into the paper sheet.

The separation of the less useful portion of the resin, prior to use, permits diversion of the removed portion to other useful purposes, either before or after further treatments, as will be hereinafter described, and hence, its removal at this stage does not involve the type of total loss that occurs from its later uncontrolled removal with the white water from the beater. For example, as will be hereinafter described, the removed components may be so treated as to increase their retention, intrinsic wet-strengthening and curing rate properties for subsequent wet-strengthening use in the beater or otherwise.

The modified resins hereinabove described thus comprise the more highly condensed, higher viscosity fractions of urea-aldehyde condensation resins. Their increased retention has been demonstrated by separating typical resins (a) into two fractions A–I, A–II, (b) into four fractions B–I, B–II, B–III and B–IV, and (c) by refractionating the first of four fractions (B–I).

TWO-FRACTION SEPARATION

To 125 gms. of Uformite 467 were added 293 gms. of methanol diluted with 220.3 gms. of water. This mixture was stirred well and warmed a few degrees until the precipitated phase dissolved. The homogeneous solution was then placed in a stoppered bottle and immersed in a 25.3° C. thermostated water bath. After 30 minutes it was separated into layers by centrifuging. The supernatant liquor was decanted and the precipitated phase was then diluted with distilled water. The precipitated fraction (A–I) was found to contain 45.3% of the resin solids by analysis.

This fraction A–I of the resin was then added to a beaten softwood kraft pulp.

The pulp suspension was of 0.25% consistency. To separate portions thereof were added 1 and 2% respectively, based on the bone-dry weight of the fibre, of the previously prepared high-molecular-weight polymer resin fraction A–I. This was followed by addition of 5% alum, based upon the bone-dry weight of the pulp, the pH of the final pulp suspension being 4.4 at 29° C.

Hand sheets were then prepared, the basis weight of the sheet being 40 lbs. (24″ x 36″—480 sheets). Pressing was carried out on a 1 ton dead weight press, two minutes on each side. The sheets were then dried for 4½ minutes between felts on a steam pipe which was internally heated to 230° F.

Other sheets were prepared in the same manner using instead of the resin fraction A–I of this invention, 1% and 2%, based upon the bone-dry weight of the pulp, of unfractionated virgin Uformite 467.

The bone dry sheets were analyzed for nitrogen content to determine the per cent of resin retention, with the following results (after correcting for the nitrogen content of the pulp), indicating practically double adsorption of the highly-polymerized fraction.

Table I

|  | Percent Retention | |
|---|---|---|
|  | 2% resin | 1% resin |
| Resin fraction A–I | 72.7 | 83.8 |
| Virgin Uformite | 39.4 | 39.8 |

Samples of each of these sheets were additionally cured for 24 hours in a hot air circulating oven at 100° C. and then tested as follows, for wet strength:

A strip of ½ inch width was moistened by means of a camel's hair brush dipped into water and the strip thus moistened or brushed transversely at the appropriate zone was tested in the tensile-strength-testing machine. The wet-tensile-strength recorded by the machine represents the load in pounds which the moistened strip of ½ inch width can support at the rupture or breaking point.

The results were as follows:

Table II

|  | Wet Strength, lbs. per half-inch | |
|---|---|---|
|  | 2% | 1% |
| Resin fraction A–I | 8.04 | 7.14 |
| Virgin Uformite | 6.85 | 5.70 |

It will be noted that with 1% of fraction A–I, better wet strength was secured than with 2% virgin Uformite.

FOUR-FRACTION SEPARATION

To 200 gms. of Uformite 467 mixed with 336 gms. of water were added 233 gms. of methanol. The procedure followed that previously described for the initial fractionation.

After removal of the precipitated phase B–I, more precipitant (77 gms. methanol) was added to the decanted supernatant liquor and the procedure was repeated to separate a second precipitated phase B–II.

To the second decanted supernatant liquor was added further precipitant (149 gms. methanol) and the procedure again repeated. This produced a third fraction B–III, separated as a precipitated phase and the remaining fourth fraction B–IV comprised the remaining supernatant liquor. Nitrogen analysis showed that fraction B–I contained 17.5%, B–II contained 22.0%, B–III contained 9.2%, and B–IV contained 51.3% of the resin solids.

Each of these resin fractions was added in varying amounts to pulp as hereinbefore described except that the amount of alum added was 23%, based on the bone-dry weight of the pulp. The retention, as tested in hand sheets prepared in accordance with the previously described procedure, was as follows:

Table III

| Fraction Resin | Percent Resin added to paper | Percent Resin in paper | Percent Retention of Resin |
|---|---|---|---|
| B–I | 3.00 | 2.12 | 70.8 |
|  | 2.00 | 1.46 | 72.9 |
|  | 1.00 | 0.78 | 78.3 |
|  | 0.50 | 0.49 | 97.2 |
| B–II | 3.00 | 1.84 | 61.3 |
|  | 2.00 | 1.43 | 71.0 |
|  | 1.00 | 0.73 | 72.7 |
|  | 0.50 | 0.42 | 84.3 |
| B–III | 3.00 | 1.29 | 42.9 |
|  | 2.00 | 1.11 | 55.4 |
|  | 1.00 | 0.67 | 66.7 |
|  | 0.50 | 0.38 | 75.0 |
| B–IV | 10.00 | 0.70 | 7.0 |
|  | 7.50 | 0.55 | 7.3 |
|  | 5.00 | 0.42 | 8.4 |
|  | 3.00 | 0.32 | 10.7 |

The figures in column 3 are after correcting for the nitrogen content of the pulp.

Wet tensile strength tests after 24 hours curing at 100° C. produced the following results:

Table IV

| Resin Fraction | Resin addition | | | |
|---|---|---|---|---|
|  | 3% | 2% | 1% | 0.5% |
| B–I | 11.92 | 11.04 | 9.44 | 7.00 |
| B–II | 12.60 | 10.68 | 9.38 | 7.61 |
| B–III | 8.13 | 7.20 | 5.44 | 5.51 |
|  | 10% | 7.5% | 5% | 3% |
| B–IV | 4.89 | 4.10 | 3.66 | 3.06 |

The gain in strength with fractions B–I, B–II over those of both fraction A–I and virgin Uformite shown in Table II was indeed startling even though more alum was used with the "B" fraction.

CURING RATES

In addition to the wet strength tests that were made on the sheets that were cured for 24 hours, other sheets were tested for wet strength immediately after removal from the steam pipes (designated zero time of curing), after 2 minutes, 5 minutes, 30 minutes, 1 hour, and 24 hours, respectively, in the oven at 100° C. In the case of the fraction A–I the results were as follows, as contrasted with those of the whole resin:

Table V

| Time of Cure at 100° C. | Wet strengths (lbs. per ½ inch) | | | | | |
|---|---|---|---|---|---|---|
| | 1 min. | 2 mins. | 5 mins. | 30 mins. | 1 hr. | 24 hrs. |
| 1% resin fraction A–I | 5.04 | 5.48 | 5.83 | 6.60 | 6.97 | 7.14 |
| 2% resin fraction A–I | 6.25 | 7.31 | 9.01 | 8.51 | 8.43 | 8.04 |
| 1% virgin Uformite | 2.81 | 3.84 | 4.55 | 5.15 | 4.80 | 5.70 |
| 2% virgin Uformite | 2.63 | 5.54 | 5.76 | 6.18 | 6.54 | 6.85 |

For the purposes of comparison, the curing rate was taken to be $$\frac{S_0 + S_{2m}}{S_{60m} + S_{24h}}$$

where $S_0$ = wet tensile strength at zero time of curing
$S_{2m}$ = wet tensile strength after 2 minutes curing
$S_{60m}$ = wet tensile strength after 60 minutes of curing
$S_{24h}$ = wet tensile strength after 24 hours of curing This is roughly the ratio of the strength after 1 minute of curing to the strength after several hours of curing and is directly related to the rate of cure.

Calculated from the above formula, the curing rates for the four sheets were as follows:

Table VI

| | 2% | 1% |
|---|---|---|
| Resin fraction A–I | 0.82 | 0.75 |
| Virgin Uformite | 0.69 | 0.63 |

Wet tensile strengths were also run on sheets prepared from each of the four fractions B–I, B–II, B–III, B–IV with the following results:

Table VII

| Resin Fraction | pH of paper | Percent Resin in paper | Wet Tensile Strength (lbs. per ½ inch) after Indicated Times of Cure | | | | |
|---|---|---|---|---|---|---|---|
| | | | 0 min. | 2 mins. | 5 mins. | 60 mins. | 24 hrs. |
| B–I | 5.09 | 2.12 | 9.50 | 10.91 | 10.87 | 11.48 | 11.92 |
| | 5.04 | 1.46 | 8.78 | 9.08 | 9.11 | 9.95 | 11.04 |
| | 5.00 | 0.78 | 6.45 | 7.04 | 7.53 | 8.58 | 9.44 |
| | 5.00 | 0.49 | 5.29 | 5.19 | 5.59 | 6.05 | 7.00 |
| B–II | 4.97 | 1.84 | 8.56 | 10.52 | 10.10 | 12.12 | 12.60 |
| | 4.82 | 1.43 | 8.90 | 9.75 | 9.20 | 11.34 | 10.68 |
| | 4.90 | 0.73 | 6.76 | 7.04 | 7.69 | 8.98 | 9.38 |
| | 4.92 | 0.42 | 5.39 | 5.63 | 6.09 | 6.62 | 7.61 |
| B–III | 4.99 | 1.29 | 6.47 | 7.13 | 6.61 | 9.57 | 8.13 |
| | 4.91 | 1.11 | 6.43 | 6.45 | 6.34 | 8.58 | 7.20 |
| | 4.90 | 0.67 | 4.32 | 4.98 | 4.62 | 6.01 | 5.44 |
| | 4.98 | 0.38 | 2.68 | 3.22 | 3.52 | 4.16 | 5.51 |
| B–IV | 4.89 | 0.70 | 1.94 | 3.50 | 3.70 | 4.33 | 4.89 |
| | 4.82 | 0.55 | 1.85 | 2.71 | 2.95 | 3.44 | 4.10 |
| | 4.89 | 0.42 | 1.50 | 1.51 | 2.02 | 2.44 | 3.66 |
| | 4.80 | 0.32 | 1.57 | 1.61 | 1.57 | 2.17 | 3.06 |

The pH of the paper has been given in order to show that the more effective curing rates cannot be explained on a pH basis.

Calculating the curing rates from Table VII gives the following results:

Table VIII

| Fraction | Curing rate for given resin addition | | | |
|---|---|---|---|---|
| | 3% | 2% | 1% | 0.5% |
| B–I | 0.87 | 0.85 | 0.75 | 0.80 |
| B–II | 0.77 | 0.85 | 0.75 | 0.77 |
| B–III | 0.77 | 0.82 | 0.81 | 0.61 |
| | 10% | 7.5% | 5.0% | 3.0% |
| B–IV | 0.59 | 0.60 | 0.49 | 0.61 |

REFRACTIONATION

In order to determine whether the possibility existed of producing a resin fraction which would be even more highly retained than the fraction B–I of the B fractions group, a re-fractionation of B–I was conducted as follows to produce two sub-fractions, hereinafter designated sub-fraction B–I–1 and the sub-fraction B–I–2.

The fraction B–I was dissolved in water to form a solution in which the solids content was approximately 12.5%. To 116 grams of this solution, was added 125 ml. of methanol. The precipitated phase (B–I–1) was separated by centrifuging and a large excess of methanol was added to the supernatant liquid to cause the precipitation of another fraction (B–I–2). The portion of the resin not precipitated as B–I–1 and B–I–2 was not tested but was discarded.

These resins were added in amounts of 3.9% resin, based upon the bone dry weight of the pulp, to a pulp at a consistency of 1.2% and followed by the addition of 4.8% alum based on the bone dry weight of the pulp. The adsorption as shown by nitrogen analysis was as follows:

Table IX

Adsorption of Re-Fractionated Resin

| Material | Percent Adsorption (by N analysis) |
|---|---|
| Fraction B–I | 83.6 |
| Sub-Fraction B–I–1 | 91.7 |
| Sub-Fraction B–I–2 | 87.0 |
| Virgin Uformite | 47.0 |

INCREASING THE ADSORBABILITY OF POORLY ADSORBED RESIN FRACTIONS

Virgin Uformite 467 resin was fractionated into two parts C–I, C–II, as follows:

To 100 grams of Uformite 467 diluted with 176 grams of water were added 235 grams of methanol and the separation of the precipitated phase (C–I) carried out as above.

The second, poorly-condensed part, C–II in the supernatant liquor, was concentrated under vacuum to recover the methanol and increase the solids content sufficiently (to about 45–50%) i. e. boiling under reflex at atmospheric pressure, for "cooking". 50% formic acid was added frequently to maintain the pH in the range of 5.4–5.8. After several hours of "cooking", the resin solution was cooled and 10% sodium carbonate solution was added to bring the pH slightly above 7.

The "cooked" resin solutions prepared in this manner were then treated as virgin resin solutions. Thus, they were fractionated as follows:

To 100 grams of "cooked" resin solution were added 176 grams of water and then 235 grams of methanol to precipitate out part of the resin. The precipitated fraction was designated C–II–1 and the non-precipitated or poorly condensed fraction in the supernatant liquor was designated C–II–2.

The precipitated fraction was designated C–II–1 and the non-precipitated or poorly condensed fraction in the supernatant liquor was designated C–II–2.

The data are collected in Tables X and XI, Table X giving the viscosity and fractionation data and Table XI the adsorption data:

Table X

| Cook No. | Viscosity (cps.) at 25° C. at solids concentration=45% | | Percent of Resin in— | |
|---|---|---|---|---|
| | Before Cooking | After Cooking | Fraction C-II-1 | Fraction C-II-2 |
| 1 | | 21.6 | 25.5 | 74.5 |
| 2 | 15.7 | 39.6 | 46.0 | 54.0 |
| 3 | 16.5 | 79.5 | 50.5 | 49.5 |

From Table X it is clear that the "cooking" was responsible for the production of a resin of higher molecular weight because, as the viscosity of the "cooked" resin was increased from 22 to 80 centipoises, the portion of the cooked resin precipitated by methanol under standardized conditions increased from 26% to 51%.

Adsorption figures were obtained for each of the materials in Table X. The results are shown in Table XI. The data in Table XI further demonstrate that adsorption of the cooked resin is directly related to the extent of cooking which, in turn, is indicated by increase of viscosity. By cooking to about the same viscosity as virgin Uformite (cook 3), the adsorption of the "cooked" resin has been raised to 47%, which is about the value usually found for virgin Uformite. Thus, it was proved that the "cooked" resin, like the original Uformite could also be fractionated by methanol to yield a portion adsorbed to a much higher extent.

Table XI
PERCENT ADSORPTION (BY N ANALYSIS)

| Cook No. | C-II Before Cooking | C-II After Cooking | Fraction C-II-1 | Fraction C-II-2 |
|---|---|---|---|---|
| 1 | 19.4 | 24.2 | 57.5 | 12.9 |
| 2 | 16.7 | 39.7 | 64.2 | 12.4 |
| 3 | 17.4 | a 47.3 | b 76.5 | 8.2 | a This resin solution was slightly turbid and the adsorption figure may be slightly high due to mechanical filtration of material containing nitrogen.
b Same comment as above. Error may be even greater than in (a) because the water solutions of this resin were even more turbid.

The data given in the above tables demonstrate the marked improvement obtainable in paper wet-strengthening processes utilizing the wet-strengthening agent and method of this invention, as well as the flexibility of the process according to the particular degree of wet-strengthening required, for instance, by refractionation procedure, together with a manner of recovery for useful purposes of wet-strengthening agent components which would otherwise be lost to the white water.

I claim:

1. In processes for wet-strengthening paper by the addition of a water-soluble ureaformaldehyde resin condensation product to the paper-making stock prior to formation thereof into paper, the method of reducing loss of said resin to the white water, thereby improving the retention of the resin in the paper, comprising removing from the water-soluble condensation product, prior to the addition thereof to the paper making stock, by solvent fractionation from an aqueous solution of said product lower molecular weight components comprising at least 10% of the total resin solids to provide a water-soluble resin fraction having a higher average molecular weight than said original product.

2. The method as claimed in claim 1 wherein there is removed by solvent fractionation at least 58% by weight of said original water-soluble condensation product.

3. The method as claimed in claim 1 wherein said solvent fractionation is carried out by adding methanol to an aqueous solution of said condensation product to precipitate the desired water-soluble resin fraction having a higher average molecular weight than said original product, centrifuging, and decanting the supernatant solution.

4. In processes for wet-strengthening paper by the addition of a water-soluble urea-formaldehyde resin condensation product to the paper-making stock prior to formation thereof into paper, the method of reducing loss of said resin to the white water, thereby improving the retention of the resin in the paper, comprising solvent fractionating the condensation product to remove from an aqueous solution thereof lower molecular weight components comprising at least 10% of the total resin solids to provide a water-soluble resin fraction having a higher average molecular weight than said original product, again solvent fractionating the remaining water-soluble fraction further to remove from an aqueous solution thereof lower molecular weight components comprising at least 10% of the total resin solids to provide a water-soluble resin fraction having a higher average molecular weight than the first said fraction, and thereafter adding the remaining water-soluble fraction containing the polymers of a relatively higher molecular weight to the paper-making stock in aqueous solution.

5. In processes for wet-strengthening paper by the addition of a water-soluble urea-formaldehyde resin condensation product to the paper-making stock prior to formation thereof into paper, the method of utilizing unretained portions of the resin which would otherwise be lost to the white water, comprising removing by solvent fractionation from an aqueous solution of the resin, prior to the addition of the resin to the paper-making stock a fraction amounting to at least 10% of the total resin solids and comprising low molecular weight polymers, polymerizing the removed fraction to increase the proportion of higher polymers while maintaining said polymers water soluble, again solvent fractionating the still water-soluble polymerized fraction to remove from an aqueous solution thereof lower molecular weight components comprising at least 10% of the total resin solids to provide a water-soluble subfraction having a higher average molecular weight than said polymerized fraction, adding the water-soluble subfraction consisting of relatively higher molecular weight polymers to the paper-making stock.

References Cited in the file of this patent
UNITED STATES PATENTS

| | | |
|---|---|---|
| 1,160,365 | Baekeland | Nov. 16, 1915 |
| 1,847,773 | Lionne | Mar. 1, 1932 |
| 2,325,302 | Britt | July 27, 1943 |
| 2,338,602 | Schur | Jan. 4, 1944 |
| 2,407,376 | Maxwell | Sept. 10, 1946 |
| 2,497,074 | Dudley et al. | Feb. 14, 1950 |
| 2,559,220 | Maxwell et al. | July 3, 1951 |
| 2,565,278 | Suen et al. | Aug. 21, 1951 |

FOREIGN PATENTS

| | | |
|---|---|---|
| 397,909 | Great Britain | Sept. 4, 1933 |